United States Patent
Dellach

(10) Patent No.: US 8,132,312 B2
(45) Date of Patent: Mar. 13, 2012

(54) METHOD OF MANUFACTURING A VACUUM CUP MOUNT

(75) Inventor: Kenneth P. Dellach, Shelby Township, MI (US)

(73) Assignee: Norgren Automation Solutions, Inc., Clinton Township, MI (US)

( * ) Notice: Subject to any disclaimer, the term of this patent is extended or adjusted under 35 U.S.C. 154(b) by 986 days.

(21) Appl. No.: 12/105,466

(22) Filed: Apr. 18, 2008

(65) Prior Publication Data

US 2009/0261218 A1    Oct. 22, 2009

(51) Int. Cl.
 *B21D 39/00* (2006.01)
 *B23P 11/00* (2006.01)

(52) U.S. Cl. ............. 29/505; 29/509; 29/513; 403/282; 294/64.2; 294/64.3

(58) Field of Classification Search ................ 294/64.1, 294/64.2, 64.3; 285/361; 29/505, 509, 513; 403/282; 248/205.8, 205.9
See application file for complete search history.

(56) References Cited

U.S. PATENT DOCUMENTS

| | | | |
|---|---|---|---|
| 3,061,338 A * | 10/1962 | Clark | 285/202 |
| 3,181,563 A | 5/1965 | Giffen | |
| 3,716,307 A | 2/1973 | Hansen | |
| 4,453,755 A * | 6/1984 | Blatt et al. | 294/64.2 |
| 4,828,306 A | 5/1989 | Blatt | |
| 4,957,318 A | 9/1990 | Blatt | |
| 5,188,411 A | 2/1993 | Golden | |
| 5,636,887 A | 6/1997 | Petropoulos et al. | |
| 6,213,521 B1 | 4/2001 | Land et al. | |
| 2008/0116338 A1 * | 5/2008 | Kalb | 248/205.9 |

* cited by examiner

*Primary Examiner* — Jermie Cozart
(74) *Attorney, Agent, or Firm* — Young Basile Hanlon & MacFarlane P.C.

(57) ABSTRACT

A method for manufacturing a vacuum cup mount including the steps of providing a housing having a mount base and a generally upstanding wall extending from the mount base, providing a retainer having an aperture that extends from an upper side of the retainer to a lower side of the retainer and a plurality of recesses formed on the lower side of the retainer in communication with the aperture, placing the retainer on the mount base so that the lower side of the retainer faces the mount base, and bending at least a portion of the generally upstanding wall so that the bent portion of the generally upstanding wall engages the upper surface of the retainer to secure the retainer with respect to the mount base.

19 Claims, 4 Drawing Sheets

METHOD OF MANUFACTURING A VACUUM CUP MOUNT

FIELD OF THE INVENTION

The invention relates to the field of vacuum cup mounts, and more particularly, the invention relates to a method for manufacturing a vacuum cup mount.

BACKGROUND OF THE INVENTION

In the manufacturing industry, vacuum cups are commonly utilized to engage, hold, and move large, flat panels, such as sheet metal and glass. The vacuum cups are typically connected to vacuum cup mounts that provide quick disconnect couplings to allow for quick and simple removability of the vacuum cup from the vacuum cup mount. The vacuum cup mount may be connected to a modular tooling system for manipulation by a robot or other manipulator.

Previous vacuum cup mounts have included a housing fabricated from metal. The vacuum cup mount may house a venturi for providing vacuum pressure to the vacuum cup in response to positive pressure supplied to the venturi by a hose or air line connected to a pressurized air source. Alternatively, the vacuum cup mount may receive vacuum pressure from an external vacuum pressure source through a hose or air line. A blow-off valve is also provided for supplying positive pressure to the vacuum cup to allow for the release of a workpiece from the vacuum cup, and a pressurized air source is connected to the vacuum cup mount using a hose or air line to supply pressurized air to the blow-off valve. Typically, the pressurized air source is connected to the housing of the vacuum cup mount in a fixed location on the housing, such that the position of the hose or air line that supplies pressurized air to the vacuum cup mount must be taken into consideration during the design of the modular tooling that supports the vacuum cup mount.

Previous vacuum cup mounts have included quick release mounts for the vacuum cup in the form of a bayonet coupling. Typically, the bayonet coupling is formed by providing a flange that is opposite a base wall of the vacuum cup mount. The flange defines an opening through which a mounting member that is attached to the vacuum cup may pass. Once the mounting member of the vacuum cup passes through the opening, the mounting member of the vacuum cup is rotated with respect to the vacuum cup mount to position portions of the mounting member of the vacuum cup mount in recesses that are formed between the flange and the base wall of the vacuum cup mount. In these designs, the complex geometry of the flange, recesses, and base wall of the vacuum cup mount make such vacuum cup mounts with bayonet couplings expensive to manufacture.

SUMMARY OF THE INVENTION

The invention provides a vacuum cup mount and a method for manufacturing a vacuum cup mount. The method includes the steps of providing a housing having a mount base and a generally upstanding wall extending from the mount base, providing a retainer having an aperture that extends from an upper side of the retainer to a lower side of the retainer and a plurality of recesses formed on the lower side of the retainer in communication with the aperture, placing the retainer on the mount base so that the lower side of the retainer faces the mount base, and bending at least a portion of the generally upstanding wall so that the bent portion of the generally upstanding wall engages the upper surface of the retainer to secure the retainer with respect to the mount base.

The generally upstanding wall may be substantially circular. Furthermore, a slot may be formed through the generally upstanding wall, and an ear may be formed on the retainer to engage the slot in the generally upstanding wall to restrain rotation of the retainer with respect to the housing. Also, the housing and the retainer may be configured to receive a bayonet coupling.

The method may also include the steps of fabricating the housing from a first metal and fabricating the retainer from a second metal that is different from the first metal.

Additionally, the method may include the steps of providing a first bore that extends completely through the housing between a first end of the first bore and a second end of the first bore and is in fluid communication with the mount base through a first port, placing a vacuum generator within the first bore for supplying negative pressure to the mount base through the first port in response to positive pressure, and connecting an air line to either the first end of the first bore or the second end of the first bore for supplying positive pressure to the vacuum generator.

BRIEF DESCRIPTION OF THE DRAWINGS

The description herein makes reference to the accompanying drawings, wherein like-referenced numerals refer to like parts throughout several views and wherein.

DETAILED DESCRIPTION OF THE EMBODIMENTS

Figure 1:
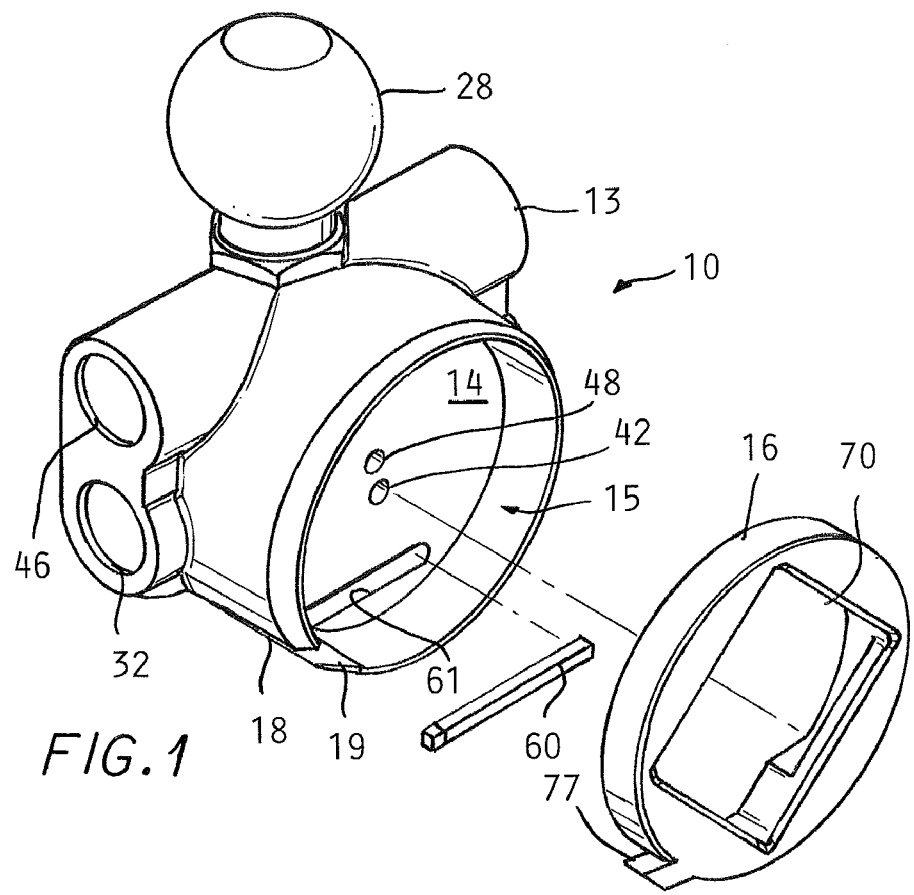
FIG. 1 is a perspective view showing the vacuum cup mount according to the invention prior to assembly.

Referring to the drawings, the present invention will now be described in detail with reference to the disclosed embodiments.

Figure 2:
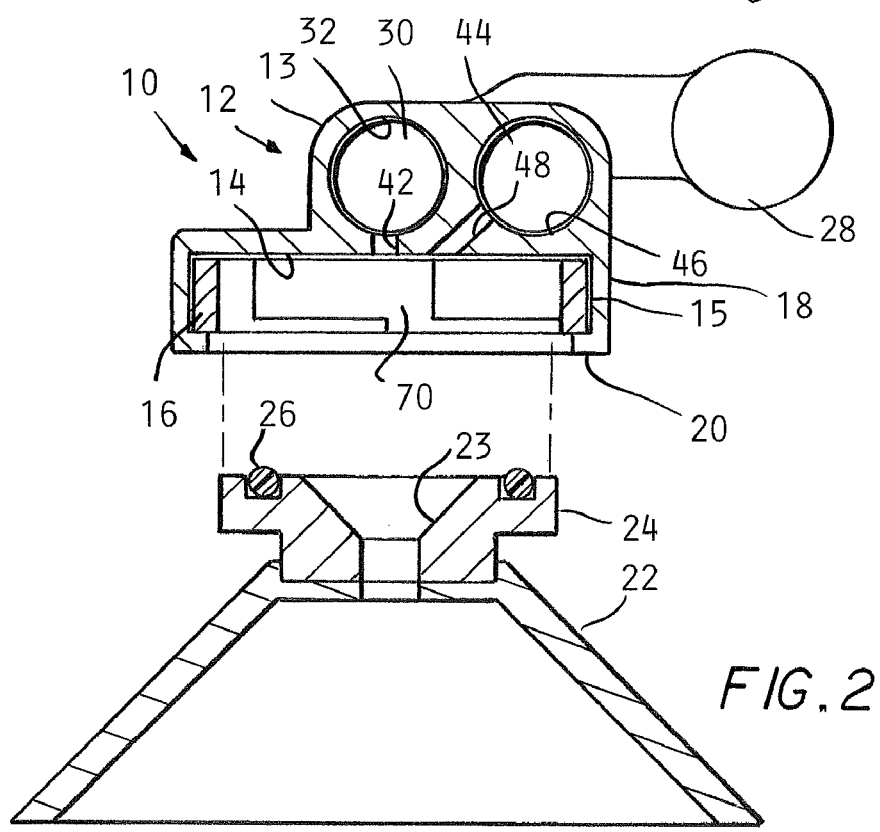
FIG. 2 is a sectional view showing a vacuum cup and the vacuum cup mount according to the invention subsequent to assembly of the vacuum cup mount.

FIGS. 1-2 show a vacuum cup mount 10 having a vacuum cup 22 mounted thereto according to the present invention. The vacuum cup mount 10 is engageable with a robotic arm (not shown) or manipulator (not shown) wherein the vacuum cup mount 10 includes a housing 12 having a mount base 14 formed thereon. The vacuum cup mount 10 also includes a retainer 16 that is disposed upon the mount base 14 and within the housing 12. By bending a generally upstanding wall 18 of the housing 12 to form an annular rim 20 (shown in FIG. 2) that engages the retainer 16, the retainer 16 is secured with respect to the mount base 14, as will be explained in detail herein. A vacuum cup 22 is provided with a fitting or bayonet coupling 24 that is receivable within an aperture 70 that extends through the retainer 16. A port or passageway 23 is formed through the bayonet coupling 24 to allow communication with a vacuum port 42 and a blow-off port 48 on the mount base 14 which are in communication with a vacuum bore 32 and a blow-off bore 46, respectively. An o-ring is provided on the bayonet coupling 24 to ensure sealed engagement between the mount base 14 and the bayonet coupling 24. Reconfigurable positioning of a vacuum generator 30 and a blow-off valve 44 within the vacuum bore 32 and the blow-off bore 46, respectively, allows for flexibility in connecting a source of pressurized air (not shown) to the vacuum cup mount 10, as will also be explained in detail herein. By providing vacuum pressure or positive pressure to the vacuum cup 22, the vacuum cup 22 can hold and release various substantially flat surfaces on a workpiece (not shown), such as glass, sheet metal, panels, etc.

In order to secure the vacuum cup 22 to the housing 12, the housing 12 is most typically an integral body that is fabricated from a light-weight, high-strength metal, such as aluminum or steel. While any number of processes may be used to fabricate the housing 12, it is specifically contemplated that the housing 12 may be fabricated from a forging. A connecting block 13 is integrally formed on the housing 12 opposite the mount base 14 to connect the vacuum cup mount 10 to the pressurized air source, as will be explained in detail herein. A mounting member 28 is integrally formed on the housing 12 to facilitate connection of the housing 12 to a modular tooling assembly (not shown) or other fixture in order to allow the vacuum cup mount 10 to be manipulated by a robot (not shown). The mounting member 28 may be a ball mount, as seen in FIGS. 1-2, or the mounting member 28 may be a post mount, a rotatably positionable serrated disk mount, or other suitable mounting structure. Of course, the mounting member 28 may be omitted in favor of other mounting structures, such as a mounting flange (not shown) that allows the housing 12 to be bolted to a support structure (not shown).

The mount base 14 is a substantially planar surface that is formed on the housing 12 to allow sealed engagement of the bayonet coupling 24 with the housing 12. The mount base 14 may be substantially circular, substantially square, substantially rectangular, or any other desired shape. The wall 18 of the housing 12 is substantially circular, substantially surrounds the mount base 14, and extends integrally away from the mount base 14 of the housing 12. Thus, the wall 18 of the housing 12 defines a cupped portion 15 on the exterior of the housing 12, adjacent to the mount base 14.

Figure 3:
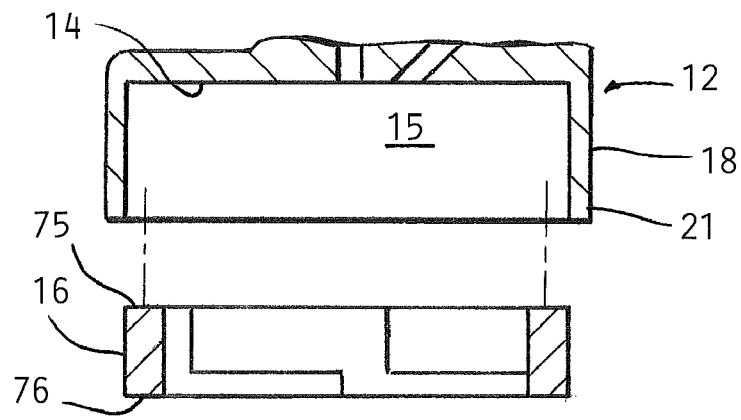
FIG. 3 is a sectional view showing a mount base and a retainer of the vacuum cup mount prior to assembly.
Figure 4:
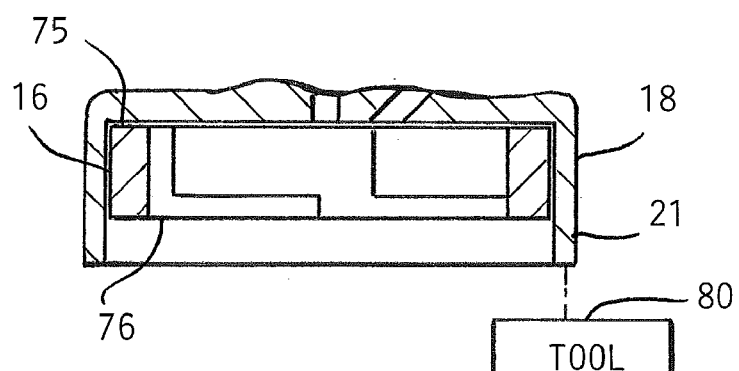
FIG. 4 is a sectional view showing a mount base and a retainer of the vacuum cup mount during assembly, wherein the retainer is in engagement with the mount base, and a tool is positioned adjacent to the vacuum cup mount.
Figure 5:
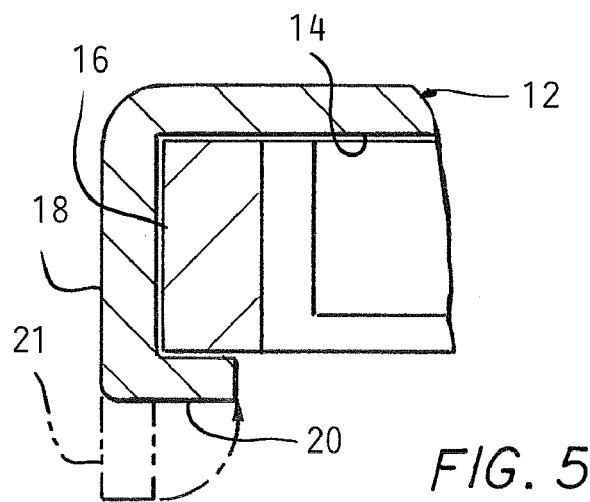
FIG. 5 is a detail view showing the wall and rim portions of the vacuum cup mount subsequent to assembly.

To assemble the retainer 16 to the mount base 14, the housing 12 of the vacuum cup mount 10 is initially fabricated such that the wall 18 of the housing 12 extends substantially perpendicular from the mount base 14 from a junction with the mount base 14 to a free end or end portion 21 of the wall 18, as shown in FIG. 3. Assembly of the vacuum cup mount 10 proceeds by aligning the retainer 16 with the cupped portion 15 of the housing 12, such that a lower side 75 of the retainer 16 faces toward the mount base 14, and an upper side 76 of the retainer 16 faces away from the mount base 14. The retainer 16 is then placed in engagement with the mount base 14 with the lower side 76 of the retainer 16 facing and abutting the mount base 14, as shown in FIG. 4. A tool 80 is then placed in an operating position with respect to the wall 18 of the housing 12. By way of example, the tool 80 may be a conventional orbital forming tool of the type that applies pressure to a workpiece while rotating with respect to the workpiece in order to shape the workpiece along a substantially circular or substantially semi-circular path, as is well known in the art. However, any well known bending or crimping tools may be used. The tool 80 is engaged with the end portion 21 of the wall 18 of the housing 12 to bend at least the end portion 21 of the wall 18 at an angle of substantially 90 degrees with respect to the wall 18 to form the annular rim 20, so that the annular rim 20 engages the upper side 76 of the retainer 16 to secure the retainer 16 with respect to the mount base 14, as shown in FIG. 5.

From the foregoing, it will be recognized that by forming the housing 12 and the retainer 16 separately, the cost of fabricating the vacuum cup mount 10 may be reduced by reducing the complexity of machining or otherwise forming the recesses 72. Also, by fabricating the housing 12 and the retainer 16 separately, the housing 12 and the retainer 16 may be formed from different materials. Thus, the retainer 16 may be fabricated from a high strength material suited to resist wear over repeated cycles of connection and disconnection of the bayonet coupling 24, such as brass, while the housing 12 may be fabricated from a lightweight metal that is less expensive to fabricate, such as aluminum or steel, a previously indicated.

Figure 6:
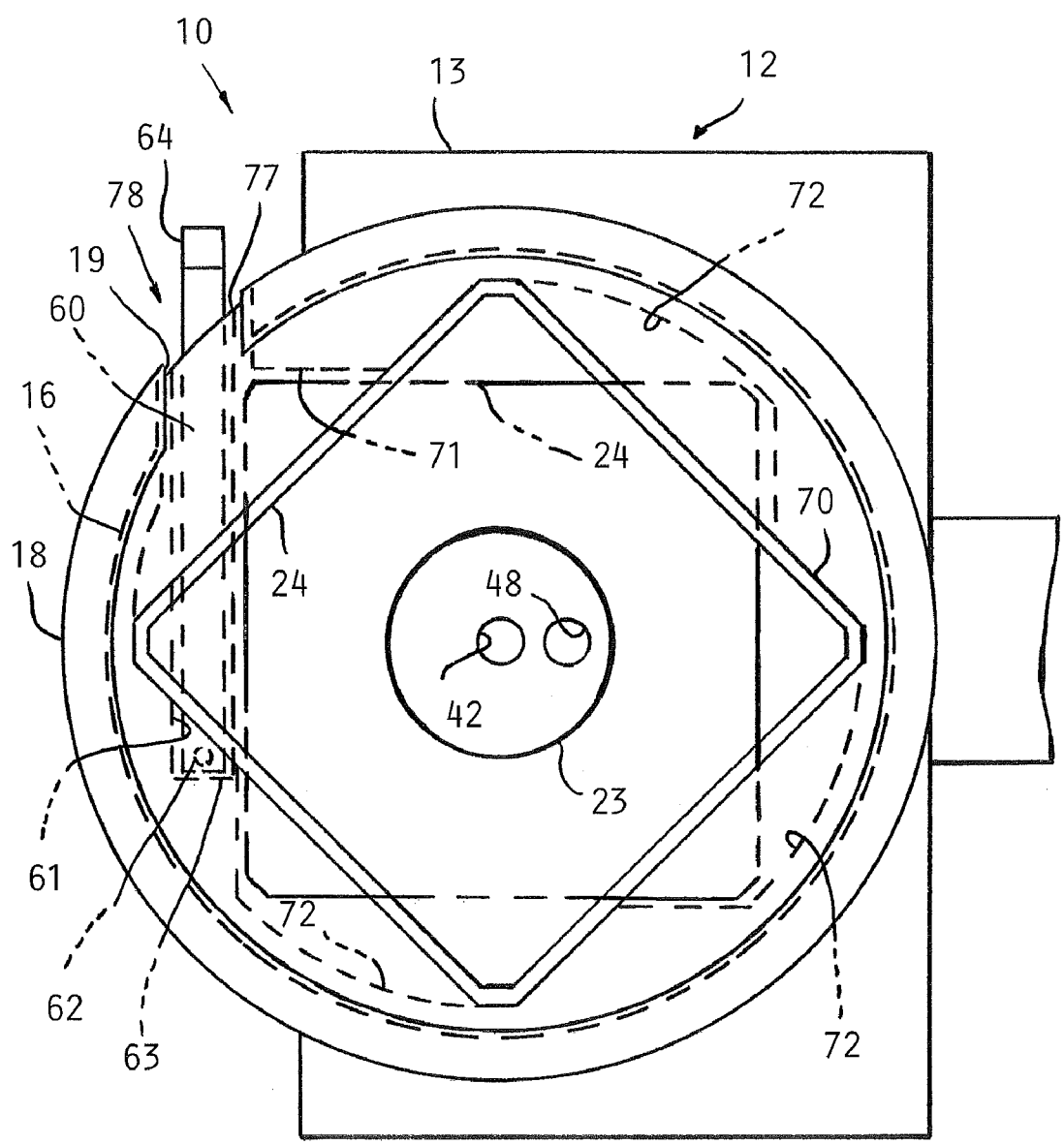
FIG. 6 is a bottom view showing the vacuum cup mount and a bayonet coupling of the vacuum cup.
Figures 7, 8:
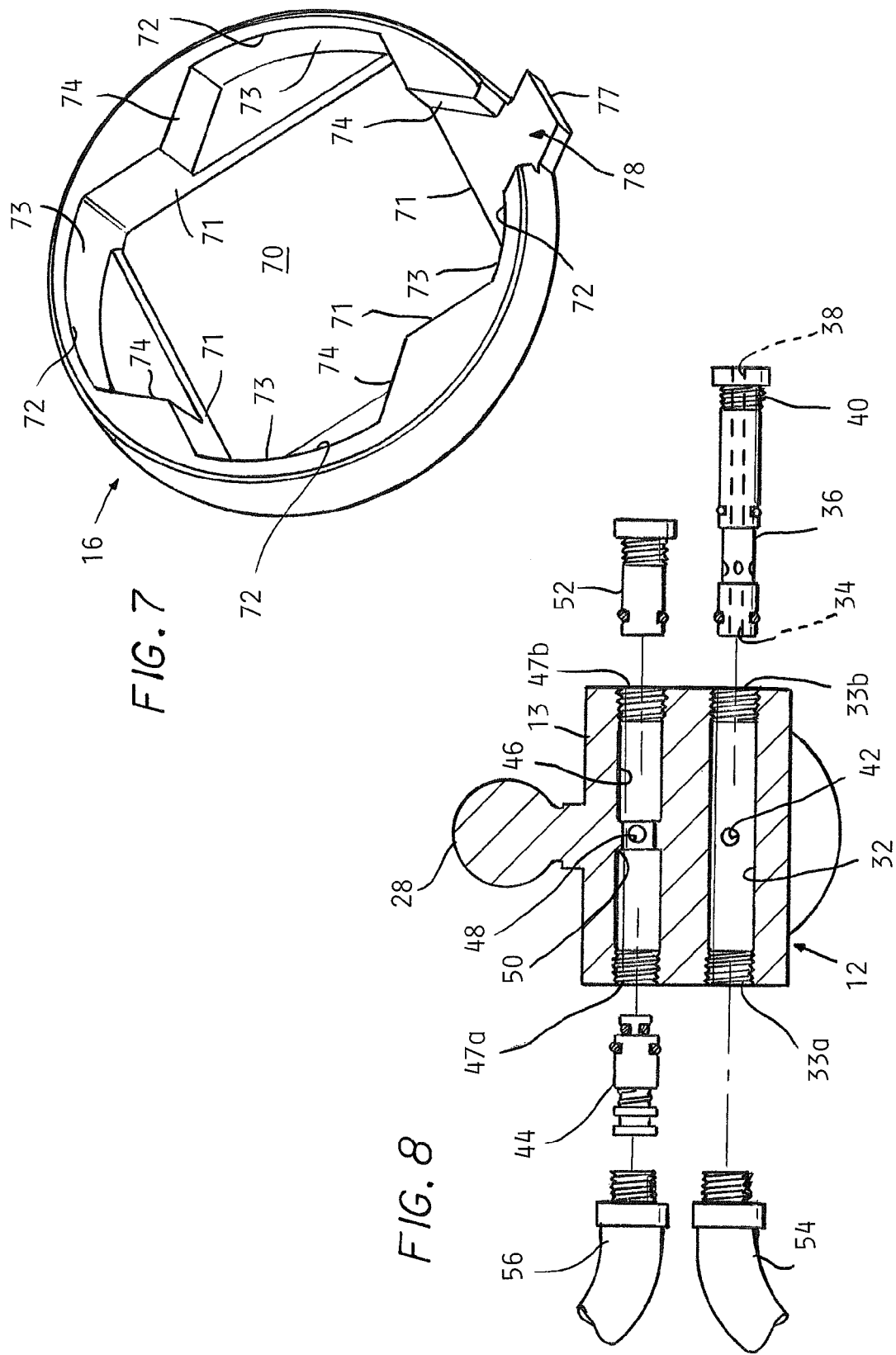
FIG. 7 is a perspective view showing the retainer.
FIG. 8 is an exploded sectional view showing a vacuum passage, a vacuum generator, a blow-off passage and a blow off valve of the vacuum cup mount.

In order to be seated against the mount base 14 and receive the bayonet coupling 24, the retainer 16 is substantially disc shaped, as shown in FIG. 6. The retainer 16 is fabricated from a metal, such as brass, which is a light-weight, high-strength material that can withstand the forces applied to the vacuum cup mount 10 by the bayonet coupling 24 without wearing. As best seen in FIG. 7, the aperture 70 that extends through the retainer 16 is substantially square and is defined by a plurality of aperture walls 71 that are formed on the retainer 16. A plurality of recesses 72 are formed in the aperture walls 71 on the lower side 75 of the retainer 16, and thus, the recesses 72 are located adjacent to the mount base 14 and in communication with the aperture 70. Each recess 72 includes an arcuate recess wall 73 that leads into a substantially flat recess wall 74 that merges with the aperture walls 71 of the retainer 16. The aperture 70 is sized so that the bayonet coupling 24 of the vacuum cup 22 may be received in and pass through the aperture 70 in the retainer 16. As will be explained herein, an ear 77 extends outward from the retainer 16 adjacent to one of the recesses 72, and the arcuate recess wall 73 and the flat recess wall 74 of recess 72 are separated by a passage 78 that is formed radially through the retainer 16 adjacent to the ear 77.

Referring back to FIG. 6, it is seen that the bayonet coupling 24 is substantially square and defines a first, unlocked position with respect to the mount base 14 after the bayonet coupling 24 passes through the aperture 70 and remains aligned with the aperture 70 of the retainer 16, having not been rotated with respect to the aperture 70. The bayonet coupling 24 is moved from a first or unlocked position to a second or locked position by rotating the bayonet coupling 24 with respect to the aperture 70 of the retainer 16 until the bayonet coupling 24 engages the substantially flat recess walls 74 of the recesses 72. The bayonet coupling 24 defines the locked position with respect to the mount base 14 when the bayonet coupling 24 is not aligned with the aperture 70 of the retainer 16 and at least portions, such as a plurality of corners 25, of the bayonet coupling 24 are disposed within the recesses 72, and thus, the corners 25 of the bayonet coupling 24 are captured between the retainer 16 and the mount base 14. Also, while the bayonet coupling 24 is in the locked position, the bayonet coupling 24 remains engaged with the substantially flat recess walls 74 of the recesses 72.

To maintain the bayonet coupling in the locked position, the bayonet coupling 24 is restrained against moving from the locked position to the unlocked position by a locking member 60. The locking member 60 is connected to the mount base 14 and is biased away from the mount base 14. The locking member 60 is movable toward and away from the mount base 14 and may be received in a slot or depression 61 formed on the mount base 14. For example, the locking member 60 may be a strip of resilient material having elastic memory, such as spring steel, that is connected to the mount base 14 by a fastener 62 at a first end 63 of the locking member 60. The locking member 60 extends from the first end 63 through the exterior wall 18 through an opening 19 formed through the wall 18 of the housing 12 to a free end 64. The free end 64 of the locking member 60 extends through the opening 19 as well as through the passage 78 of the retainer 16. To prevent rotation of the retainer 16 with respect to the mount base 14, the ear 77 of the retainer 16 extends into the opening 19, wherein sides of the ear 77 of the retainer 16 abut the portions of the wall 18 of the housing 12 defining the opening 19.

The locking member 60 passes through the area of the mount base 14 under the aperture 70 in the retainer 16. When the bayonet 24 is placed into engagement with the mount base 14 in the unlocked position, the locking member 60 is depressed by engagement of the bayonet 24 against the retainer 16 wherein the locking member 60 is disposed in a disengaged position. When the locking member 60 is in the disengaged position, the locking member 60 is disposed in the slot 61 of the mount base 14, and thus, the locking member 60 does not restrain rotational motion of the bayonet 24.

When the bayonet 24 is rotated to the locked position, the bayonet 24 rotates past the locking member 60, and the locking member 60 is biased away from the mount base 14 into an engaged position. When the locking member 60 is in the engaged position, the locking member 60 is engageable with the bayonet 24 to restrain and prohibit rotational motion of the bayonet 24 with respect to the mount base 14, thereby prohibiting the bayonet 24 from rotating the unlocked position.

Before the bayonet 24 may be returned to the unlocked position, the locking member 60 must first be moved from the engaged position to the disengaged position so that the locking member 60 no longer restrains rotational motion of the bayonet 24 with respect to the mount base 14. The locking member 60 is returned to the disengaged position from the engaged position by moving the free end 64 of the locking member 60 toward the mount base 14. Once the locking member 60 is in the disengaged position, the bayonet 24 is no longer restrained against moving from the locked position toward the unlocked position, and thus, the bayonet 24 may be rotated toward the unlocked position.

When the bayonet 24 is in the locked position, vacuum pressure may be provided to the vacuum cup 22 through the use of a venturi-based vacuum generator 30 that is disposed within a vacuum bore 32 that is formed through the connecting block 13 of the housing 12, as shown in FIG. 8. The vacuum generator 30 is a substantially cylindrical cartridge that includes an inlet 34 for receiving pressurized air, a venturi 36 in communication with the inlet 34 for creating vacuum pressure, and an exhaust port 38 in communication with the venturi 36 for exhausting air from the vacuum generator 30. The vacuum generator 30 also includes a threaded plug 40 adjacent to the exhaust port 38 for connecting the vacuum generator 30 to the housing 12.

The vacuum bore 32 extends completely through connecting block 13 of the housing 12 between a first open end 33a and a second open end 33b, and the vacuum bore 32 has threaded portions adjacent both the first open end 33a and the second open end 33b. The connecting block 13 is substantially rectangular, and thus, the first open end 33a and the second open end 33b of the vacuum bore 32 are disposed on opposite faces of the connecting block 13. The vacuum bore 32 is substantially symmetrical, and a vacuum port 42 is centered between the first open end 33a and the second open end 33b of the vacuum bore 32. The vacuum port 42 extends from the vacuum bore 32 to the mount base 14 to provide fluid communication between the vacuum bore 32 and the mount base 14. More particularly, the venturi 36 of the vacuum generator 30 is disposed adjacent to the vacuum port 42. Thus, when pressurized air is supplied to the vacuum generator 30 via the inlet 34, vacuum pressure is created by the venturi 36 and transmitted to the vacuum cup 22 by way of the vacuum port 42 and the port 23 through the bayonet coupling 24.

To provide positive pressure to the vacuum cup 22, the vacuum cup mount 10 includes a blow-off valve 44 that is disposed within a blow-off bore 46 that is formed through the connecting block 13 of the housing 12. The blow-off bore 46 is subtly parallel to the vacuum bore 32 and extends from a first open end 47a to a second open end 47b wherein the ends 47a, 47b are disposed on opposite faces of the connecting block 13. The blow-off valve 44 is a one-way valve operable to allow positive pressure from a pressurized air source to be communicated to the vacuum cup 22 through a blow-off port 48 that extends from the blow-off bore 46 to the mount base 14. The blow-off bore 46 is substantially symmetrical, and the blow-off port 48 is centered between the first open end 47a and the second open end 47b of the blow-off bore 46, within an annular protrusion 50 that is formed within the blow-off bore 46. In the area of the annular protrusion 50, the blow-off bore 46 has a smaller, stepped diameter than it does toward the first open end 47a and the second open end 47b of the blow-off bore 46. The annular protrusion 50 serves to restrict movement of the blow-off valve 44 within the blow-off bore 46 by engagement with the blow-off valve 44, so that the blow-off valve 44 remains upstream of the blow-off port 48. On the opposite side of the annular protrusion 50 from the blow-off valve 44, a threaded blow-off plug 52 is threadably connectable to the housing 12 and sealingly received within the blow-off bore 46 at either the first open end 47a or the second open end 47b of the blow-off bore 46. A flexible O-ring is seated within a recess of the blow-off plug 52 to provide a sealed engagement with the blow-off bore 46. Thus, when pressurized air is supplied to the blow-off valve 44, positively pressurized air is transmitted to the vacuum cup 22 by way of the vacuum port 42 and the port 23 through the bayonet coupling 24.

Pressurized air is supplied to the vacuum generator 30 and the blow-off valve 44 by a first air line 54 and a second air line 56, respectively. To provide flexibility when setting up the vacuum cup mount 10, the vacuum bore 32 and the blow-off bore 46 are both symmetrical about planes that extend perpendicular to their respective longitudinal axes. Thus, the first and second air lines 54, 56 may be connected to the connecting block 13 of the housing 12 on either side of the connecting block 13. In particular, the first air line 54 may be connected to the vacuum cup mount 10 either at the first open end 33a of the vacuum bore 32 or at the second open end 33b of the vacuum bore 32 by threadedly engaging either end 33a, 33b of the vacuum bore 32 within the housing 12.

To connect the first air line 54 to the first open end 33a of the vacuum bore 32, the vacuum generator 30 is inserted into the vacuum bore 32 at the second open end 33b thereof and is threadedly engaged with the housing 12 at the second open end 33b of the vacuum bore 32. In this first position of the vacuum generator 30 with respect to the housing 12, the inlet 34 of the vacuum generator 30 faces the first open end 33a of the vacuum bore 32. Thus, when the first air line 54 is connected to the first open end 33a of the vacuum bore 32, the first air line 54 directs pressurized air toward the inlet 34 of the vacuum generator 30. In the alternative, the first air line 54 may be connected to the second open end 33b of the vacuum bore 32, and the vacuum generator 30 may be inserted into the first open end 33a of the vacuum bore 32 by threadedly engaging the housing 12 at the first open end 33a of the vacuum bore 32. In this second position of the vacuum generator 30 with respect to the housing 12, the inlet 34 of the vacuum generator 30 faces the second open end 33b of the vacuum bore 32. Thus, when the first air line 54 is connected to the second open end 33b of the vacuum bore 32, the first air line 54 directs pressurized air toward the inlet 34 of the vacuum generator 30.

To connect the second air line 56 to the first open end 47a of the blow-off bore 46, the blow-off valve 44 is inserted into the blow-off bore 46 at the first open end 47a thereof and is seated against the annular protrusion 50. The blow-off plug 52 is then inserted into the second open end 47b of the blow-off bore 46 and threadedly engaged with the housing 12. In this first position of the blow-off valve 44 with respect to the housing 12, the blow-off valve 44 is disposed within the blow-off bore 46 between the first open end 47a of the blow-off bore 46 and the blow-off port 48. Thus, when the second air line 56 is connected to the first open end 47a of the blow-off bore 46, the second air line 56 directs pressurized air toward the blow-off valve 44, causing the blow-off valve 44 to open and allow the pressurized air to proceed from the first open end 47a of the blow-off bore 46 to the blow-off port 48. In the alternative, the second air line 56 may be connected to the second open end 47b of the blow-off bore 46, and the blow-off valve 44 is inserted into the blow-off bore 46 at the second open end 47b thereof and is seated against the annular protrusion 50. The blow-off plug 52 is then inserted into the first open end 47a of the blow-off bore 46 and threadedly engaged with the housing 12. In this second position of the blow-off valve 44 with respect to the housing 12, the blow-off valve 44 is disposed within the blow-off bore 46 between the first open end 47a of the blow-off bore 46 and the blow-off port 48. Thus, when the second air line 56 is connected to the second open end 47b of the blow-off bore 46, the second air line 56 directs pressurized air toward the blow-off valve 44, causing the blow-off valve 44 to open and allow the pressurized air to proceed from the second open end 47b of the blow-off bore 46 to the blow-off port 48.

From the foregoing, it will be recognized that by configuring the vacuum bore 32 and the blow-off bore 46 so that the first and second air lines 54, 56 may be connected to either side of the connecting block 13 of the housing 12, the same vacuum cup mount 10 may be used in applications requiring different positioning of the air lines 54, 56 with respect to the vacuum cup mount 10. Thus, since only one housing 12 need be manufactured, costs are reduced. Furthermore, flexibility in connection of the air lines 54, 56 to the vacuum cup mount 10 increases the chances that the vacuum cup mount 10 can be re-used subsequent to retooling.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A method of manufacturing a vacuum cup mount, wherein the steps comprise:

providing a housing having a mount base and a generally upstanding wall extending from the mount base to form a substantially continuous, circular wall;

providing a retainer having an aperture that extends from an upper side of the retainer to a lower side of the retainer and a plurality of recesses formed on the lower side of the retainer in communication with the aperture;

placing the retainer on the mount base so that the lower side of the retainer faces the mount base; and bending at least a majority of the generally upstanding wall so that the bent portion of the generally upstanding wall engages the upper surface of the retainer to secure the retainer with respect to the mount base.

2. The method of claim 1, wherein the steps further comprise:

forming a slot through the generally upstanding wall and forming an ear on the retainer to engage the slot in the generally upstanding wall to restrain rotation of the retainer with respect to the housing.

3. The method of claim 1, wherein the steps further comprise:

configuring the housing and the retainer to receive a bayonet coupling.

4. The method of claim 1, wherein the steps further comprise:

providing the plurality of recesses of the retainer, each having an arcuate wall and a substantially flat wall; and providing a bayonet coupling that is rotatable between an unlocked position, wherein the bayonet coupling is not disposed within the recesses of the retainer and a locked position, wherein at least a portion of the bayonet coupling is disposed within the recesses of the retainer and wherein the bayonet coupling engages the substantially flat walls of the recesses.

5. The method of claim 4, wherein the steps further comprise:

providing a locking member on the mount base that is moveable between an engaged position, wherein the locking member restrains the bayonet coupling against moving from the locked position to the unlocked position, and a disengaged position, wherein the locking member does not restrain movement of the bayonet coupling.

6. The method of claim 5, wherein the steps further comprise:

fabricating the housing from aluminum.

7. The method of claim 1, wherein the steps further comprise:

fabricating the housing from a first metal; and fabricating the retainer from a second metal that is different from the first metal.

8. The method of claim 1, wherein the steps further comprise:

fabricating the retainer from brass.

9. The method of claim 1, wherein the steps further comprise:

providing a first bore that extends completely through the housing between a first end of the first bore and a second end of the first bore and is in fluid communication with the mount base through a first port;

placing a vacuum generator within the first bore for supplying negative pressure to the mount base through the first port in response to positive pressure; and connecting an air line to either the first end of the first bore or the second end of the first bore for supplying positive pressure to the vacuum generator.

10. A method of manufacturing a vacuum cup mount, comprising:
provide a housing having a mount base and a generally upstanding wall extending from the mount base;
providing a retainer having an aperture formed therethrough;
placing the retainer on the mount base;
bending at least a portion of the generally upstanding wall into engagement with the retainer to secure the retainer to the mount base;
providing a vacuum cup having a bayonet coupling formed thereon; and
securing the vacuum cup to the mount base by disposing at least a portion of the bayonet coupling between the retainer and the mount base.

11. The method of claim 10, wherein the steps comprise:
providing a substantially circular shape for the generally upstanding wall.

12. The method of claim 10, wherein the steps further comprise:
forming a slot through the generally upstanding wall and forming an ear on the retainer to engage the slot in the generally upstanding wall to restrain rotation of the retainer with respect to the housing.

13. The method of claim 10, wherein the steps further comprise:
providing the plurality of recesses of the retainer, each having an arcuate wall and a substantially flat wall; and
providing a bayonet coupling that is rotatable between an unlocked position, wherein the bayonet coupling is not disposed within the recesses of the retainer and a locked position, wherein at least a portion of the bayonet coupling is disposed within the recesses of the retainer and wherein the bayonet coupling engages the substantially flat walls of the recesses.

14. The method of claim 13, wherein the steps further comprise:
providing a locking member on the mount base that is moveable between an engaged position, wherein the locking member restrains the bayonet coupling against moving from the locked position to the unlocked position, and a disengaged position, wherein the locking member does not restrain movement of the bayonet coupling.

15. The method of claim 10, further comprising:
fabricating the housing from a first metal; and
fabricating the retainer from a second metal that is different from the first metal.

16. The method of claim 10, wherein the steps further comprise:
fabricating the retainer from brass.

17. The method of claim 10, wherein the steps further comprise:
fabricating the housing from aluminum.

18. The method of claim 10, further comprising:
providing a first bore that extends completely through the housing between a first end of the first bore and a second end of the first bore and is in fluid communication with the mount base through a first port;
placing a vacuum generator within the first bore for supplying negative pressure to the mount base through the first port in response to positive pressure; and
connecting an air line to either the first end of the first bore or the second end of the first bore for supplying positive pressure to the vacuum generator.

19. The method of claim 10, wherein the steps further comprise:
connecting a vacuum generator to one of a first end of a first bore or a second end of the first bore and connecting an air line to the one of the first end of the first bore or the second end of the first bore that is not connected to the vacuum generator.

* * * * *